United States Patent
Glaze

[15] 3,675,225
[45] July 4, 1972

[54] PRESSURE RATIO SENSING
[72] Inventor: Stanley George Glaze, Brierley Hill, England
[73] Assignee: H. M. Hobson Limited, London, England
[22] Filed: Nov. 12, 1969
[21] Appl. No.: 875,949

[30] Foreign Application Priority Data
Nov. 12, 1968 Great Britain......................53,600/68

[52] U.S. Cl..........................340/196, 73/407 PR, 137/81.5, 340/240, 340/201, 340/177
[51] Int. Cl..........................................................G08c 19/00
[58] Field of Search............340/196, 240; 73/407 R, 407 PR; 137/81.5, 84; 235/200 PF; 60/39.28

[56] References Cited

UNITED STATES PATENTS

| | | | |
|---|---|---|---|
| 3,384,884 | 5/1968 | Var.........................................340/196 |
| 3,466,642 | 9/1969 | Terramorsi.............................340/242 |
| 2,981,058 | 4/1961 | Reed...............................73/407 PR X |
| 3,289,479 | 12/1966 | Tausch.................................73/407 R |

Primary Examiner—John W. Caldwell
Assistant Examiner—Robert J. Mooney
Attorney—E. T. Le Gates and Martin Kirkpatrick

[57] ABSTRACT

A pressure ratio sensor for producing a signal proportional to the ratio of two pneumatic pressures derived from two probes and comprising a casing, a diaphragm dividing the casing into two chambers each having an inlet, a needle attached to the diaphragm and extending through one of the chambers and controlling, in accordance with the position of the diaphragm, the effective area of an outlet from that chamber, the signal pressure from one probe being applied directly to one of the inlets, the signal pressure of the other probe being multiplied by a known factor, the multiplied signal pressure being applied to the other inlet and the position of the needle producing a signal indicative of the ratio.

3 Claims, 3 Drawing Figures

PRESSURE RATIO SENSING

This invention provides a pressure ratio sensor which produces a signal proportional to the ratio of two absolute pneumatic pressures.

An instance of the practical application of such a unit is in the air intake of the engine of a supersonic aircraft, in which case the pneumatic pressures to be compared will be derived from two pressure probes which afford information as to the position of a shock wave at the intake, the derived signal being utilized to actuate mechanism for changing the geometry of the intake in the event of deviation of the shock wave from a desired position.

Figure 1:
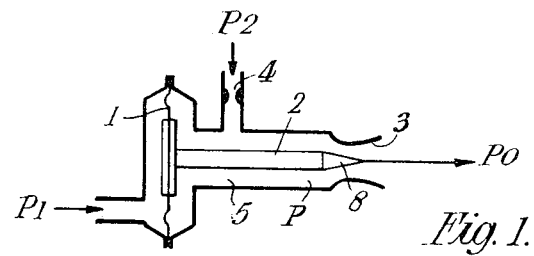

One form of apparatus which will afford a signal representative of the ratio of two pneumatic pressures is the air potentiometer which has come to be known as a microjet and is illustrated diagrammatically in FIG. 1 of the accompanying drawings.

This consists of a diaphragm subject at one side to one of the pressure $P_1$ and attached to a needle 2, having a tapered end 8 which controls the effective area of convergent-divergent outlet orifice 3 of area $a_o$. Air at the other pressure $P_2$ flows through a fixed orifice 4 of area $a_2$ and a chamber 5 at the other side of the orifice to the outlet orifice 3.

The air pressure $P$ in the chamber 5 can be determined from the following conditions, $T_2$ being the temperature of the air entering through the orifice 4 and $T$ the temperature of the air in the chamber.

Mass flow into the chamber 5, $m_1 = K_2 a_2 T_2 P_2 f(P_2/P)$
Mass flow out of the chamber 5, $m_o = K a_o T P$, provided that the orifice 3 is choked
But $m_1 = m_o$ so that, provided $T_2 = T$,
$K_2/K a_2 P_2 f(P_2/P) = a_o P$
or $$f(P_2/P) = a_o/a_2$$

and since $a_o = f(X)$, where $X$ is the displacement of the needle 2, $$X = f'(P_2/P)$$

In the steady state the needle 2 will have moved to a position in which $$P = P_1, \text{ hence}$$

$$X = f'(P_2/P_1)$$

Accordingly, provided that the outflow velocity through the orifice 3 is at least equal to the local speed of sound, the position of the needle 2 will be a function of the pressure ration $P_2/P$ and can be utilized, e.g. by means of a potentiometer, to generate an electrical signal proportional to $P_2/P_1$.

Unfortunately a microject cannot be used satisfactorily to give a signal proportional to the ratio $P_2/P_1$ when the ratio approximates to unity as is the case in the above-mentioned application to an air intake where the pressure ratio tends to vary over the approximate range of 0.7 – 1.3.

According to the invention this difficulty is overcome by application of the pressure from one probe directly to the microjet and by providing for pneumatic multiplication of the pressure sensed by the other probe by an accurately known factor prior to its application to the microjet.

The invention therefore provides a pressure ratio sensor for producing a signal proportional to the ratio of two pneumatic pressures derived from two probes and comprising a casing, a diaphragm dividing the casing into two chambers, each having an inlet, a needle attached to the diaphragm and extending through one of the chambers and controlling, in accordance with the position of the diaphragm, the effective area of an outlet from that chamber, means for applying the signal pressure from one probe directly to one of the inlets and means for multiplying the signal pressure from the other probe by an accurately known factor and applying said multiplied signal pressure to the other inlet.

Figure 2:
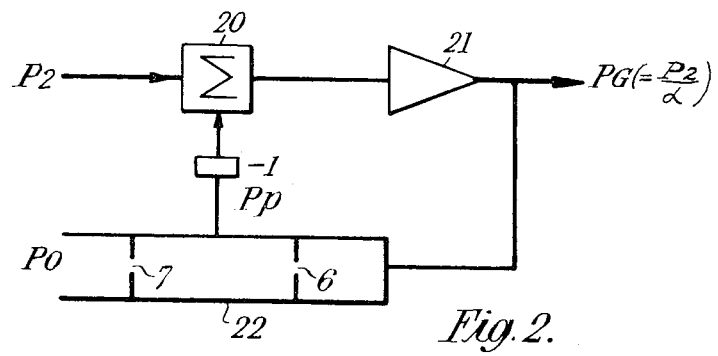

Apparatus for achieving such multiplication is shown in FIG. 2 of the drawings. As there shown the signal pressure $P_2$ from one of the probes (not shown) is passed through a pneumatic device 20 to a high gain pneumatic amplifier 21, from the output of which air at pressure $P_G$ is fed back through an air potentiometer 22 having a choked outlet. Under these conditions the pressure $P_p$ tapped from the potentiometer 22 will be an exact fraction $\alpha P_G$ of the pressure $P_G$, $\alpha$ being less than unity, determined by the areas of the two restrictors 6 and 7 in the potentiometer. The device 20 subtracts the pressure $P_p$ from the signal pressure $P_2$ and applies to the input of the amplifier 21 an air pressure equal to $P_2 - P_p$.

If G be the gain of the amplifier $$P_G = G(P_2 - P_p)$$

$$\therefore P_G = G(P_2 - \alpha P_G) = G/1 + \alpha G \, P_2$$

If therefore G is sufficiently large, $P_G = 1/\alpha \, P_2$ and $\alpha$ can be so selected that $P_G$ is, for example, three times $P_2$.

For high accuracy the gain of the amplifier must be high and the feedback flow from the air potentiometer must be a small fraction of the flow through the potentiometer if sonic velocity is not attained in the signal flow.

Suitable pneumatic pressure multiplying mechanism for achieving the result indicated in FIG. 2 is described in our copending U.S. Pat. Application Ser. No. 875,934, filed Nov. 12, 1969, now U.S. Pat. No. 3,598,137, issued Aug. 10, 1971.

Figure 3:
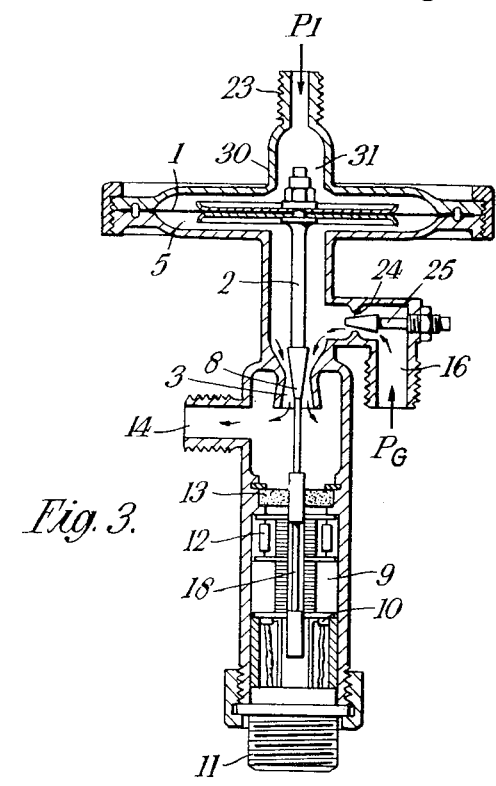

A practical form of pressure ratio sensor according to the invention is shown in FIG. 3 of the accompanying drawings, in which parts corresponding to parts in FIG. 1 bear the same reference numerals.

As there shown, a diaphragm 1 divides a casing 30 into two chambers 31 and 5 and the signal pressure $P_1$ derived from one of the probes is applied through a union 23 to the upper surface of the diaphragm 1. The tapered end 8 of the needle 2 carried by the diaphragm 1 extends into the convergent-divergent orifice 3. An extension of the needle is guided by a sealing bush 13. The multiplied other signal pressure $P_G$ is applied to the underside of the diaphragm 1 through a union 16 and an orifice 24, the area of which can be adjusted by a needle 25. After passage through the orifice 3 the air leaves through a union 14.

The needle carries the iron armature 18 of a linear transducer 10. An oscillator/demodulator assembly 12 converts a D.C. voltage applied to a connector 11 into a 10 KC/s square wave which energizes the primary winding of a transformer 9. The output in the secondary winding of the transformer, which is determined by the position of the armature 18 and therefore of the needle 2, is demodulated to supply a differential D.C. output signal.

The pressure ratio range can be modified by mechanical adjustment of one or both of the restrictors 6, 7 in the air potentiometer 22 FIG. 2

What I claim as my invention and desire to secure by Letters Patent is:

1. A pressure ratio sensor for producing a signal proportional to the ratio of two pneumatic pressure signals derived from two probes and comprising:
   a casing;
   a diaphragm dividing the casing into two chambers, each having a inlet;
   a needle attached to the diaphragm and extending through one of the chambers, said needle controlling, in accordance with the position of the diaphragm, the effective area of an outlet from that one chamber;
   means for applying the signal pressure from one probe directly to one of the inlets;
   means for multiplying the signal pressure from the other probe by an accurately known factor and applying said multiplied pressure to the other inlet; and,
   signal producing means for producing a signal indicative of the position of the needle.

2. A sensor as claimed in claim 1, in which the multiplying means comprises a high gain pneumatic amplifier having, connected to its output, an air potentiometer containing two restrictors in series, and a pneumatic device, connected to the input of the amplifiers and to a tapping in the air potentiometer between the restrictors, which subtracts from the signal pressure to be multiplied the pressure at the tapping in the air potentiometer and applies this difference in air pressure to the input of the amplifier.

3. A sensor as claimed in claim 1 in which the needle carries the armature of a transformer adapted to generate an electrical signal indicative of the position of the needle and therefore of the ratio between the unmultiplied and the multiplied pressure signals.

* * * * *